June 21, 1932. L. HOLDER 1,863,558
BINOCULAR PHOTOGRAPHIC DEVICE
Filed Jan. 24, 1930 2 Sheets-Sheet 2

Lawrence Holder
INVENTOR
BY Victor J. Evans
ATTORNEY

Patented June 21, 1932

1,863,558

UNITED STATES PATENT OFFICE

LAWRENCE HOLDER, OF LOS ANGELES, CALIFORNIA

BINOCULAR PHOTOGRAPHIC DEVICE

Application filed January 24, 1930. Serial No. 423,219.

The general object of this invention is to provide a photographic device having a binocular arrangement therein which will produce an image having a relief effect, by reason of the fact that two images are formed, these merging so that the two pictures or images appear as one and the picture stands out on a plane surface as if in relief.

The invention also relates to the method of producing the pictures.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
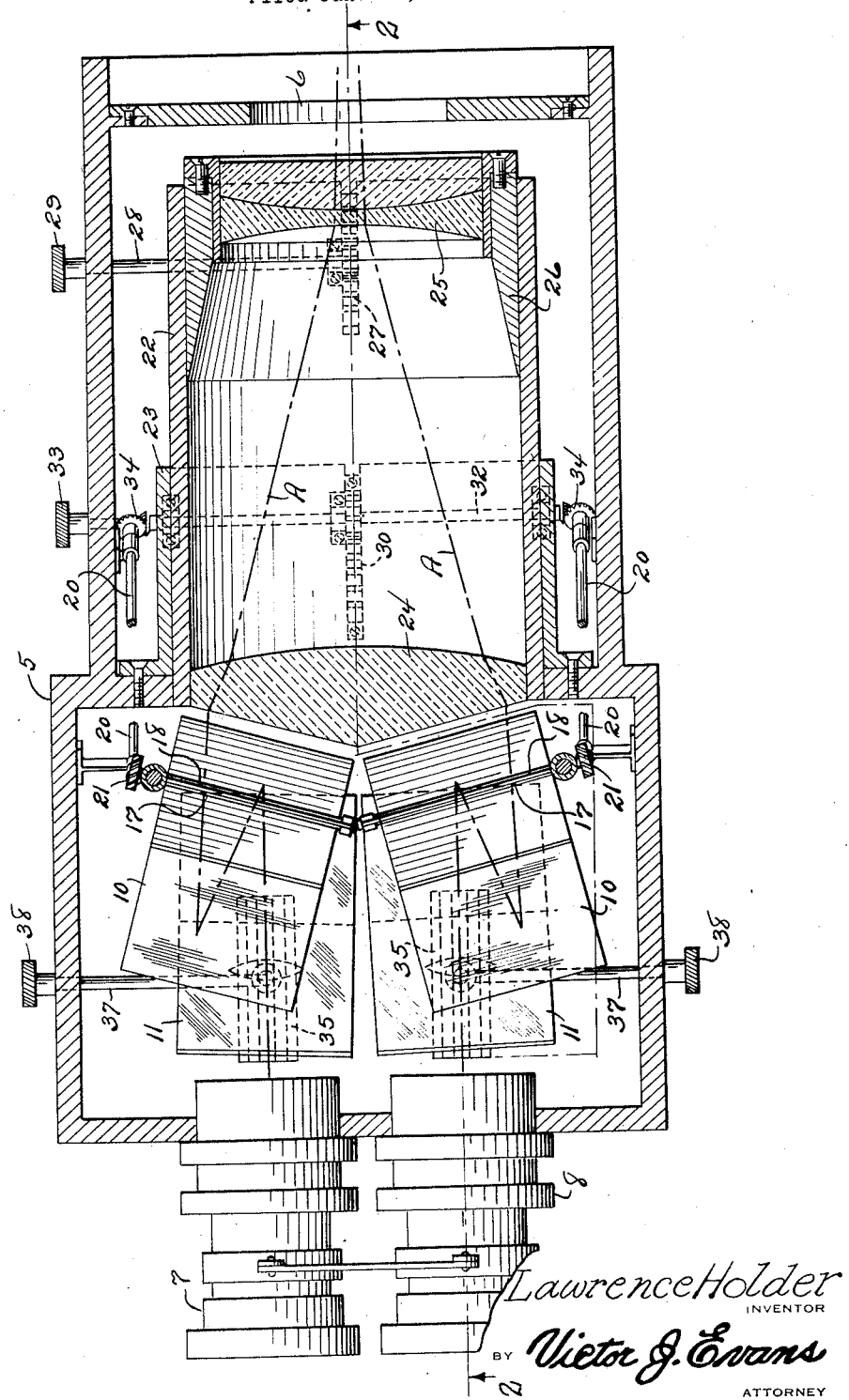
Figure 1 is a section on line 1—1 of Figure 2.
Figure 2:
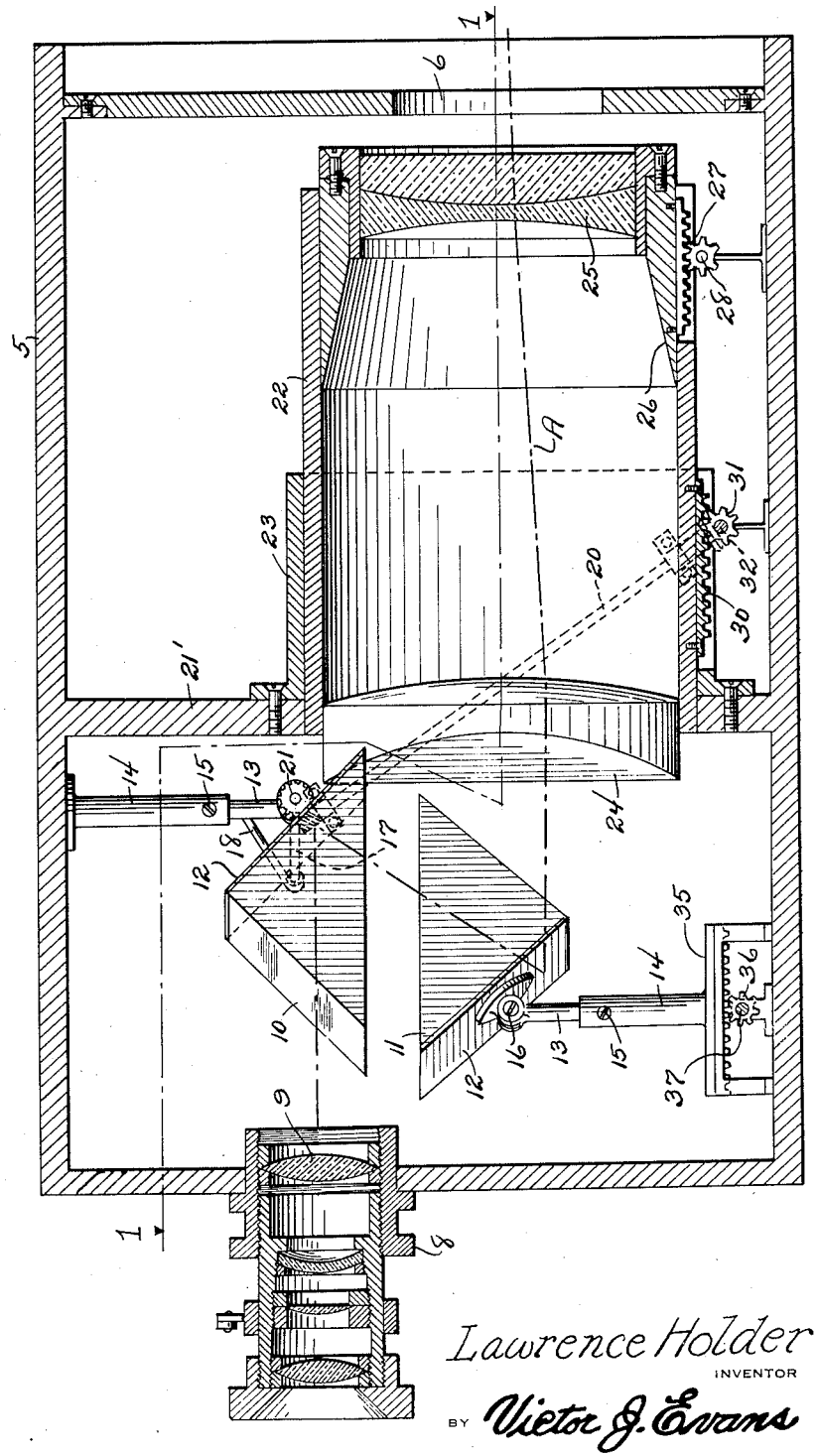
Figure 2 is a section on line 2—2 of Figure 1.

In these views, the numeral 5 indicates a casing which may be attached to or formed with a camera or other photographic device, and this casing has an opening 6 in its rear through which the light rays pass to the sensitized medium in the camera. A pair of lens barrels 7 and 8 is arranged in the front of the casing, these barrels carrying the usual or any desired lenses 9. A pair of prisms 10 and 11 is arranged in the casing to receive the light rays from each lens barrel, each prism being of substantially triangular shape, with a metal plate 12 attached to one face of each prism, this plate forming a reflecting surface, or that face of the prism which is engaged by the plate may be provided with a mirror surface. Each plate is pivoted to an end of a rod 13 which has sliding movement in a post 14, the rod being held in adjusted position by a set screw 15 and a set screw 16 forms the pivotal connection between the rod and the metal plate for each lower prism, so that after the prism is adjusted on the rod, by tightening this screw, the prism can be held in adjusted position. The upper prism 10 has its post depending from the top of the casing and the lower prism has its post extending upwardly from the bottom of the casing. Each upper prism has its pivotal point formed by a shaft 17 rotatably supported by the rod 13 and an arm 18 connected to the rod. A shaft 20 is connected with the outer end of each shaft 17 by the worm gearing 21, so that by turning the shafts 20, the upper prisms 10 are rocked around a horizontal axis formed by the shafts 17.

A partition 21' divides the casing 5 into a front chamber and a rear chamber and the prisms 10 and 11 are located in the front chamber. A barrel 22 is arranged in the rear chamber and has its front end located in a hole in the partition adjacent the bottom of the casing, this barrel being slidably supported by the annular member 23 which is fastened to the partition. A prism 24 is carried by the front end of the barrel and anastigmatic lenses 25 are carried by an annular member 26 slidably mounted in the rear end of the barrel. The member 26 is adjusted in the barrel through the rack means shown generally at 27, which is operated from the shaft 28 passing through the casing and having a handle 29 at its outer end. The barrel is also adjusted through means of the rack 30 and the pinion 31 which is arranged on a shaft 32 having one end passing through the casing, where said end is provided with a handle 33. This shaft 32 is connected with the shafts 20 by the gears 34 so that the prisms 10 will be adjusted at the same time the barrel 22 is adjusted.

Each of the lower prisms 11 is also adjustable horizontally by having the post 14 provided with a base 35 having rack teeth thereon which is engaged by a pinion 36 on a shaft 37 passing through the side of the casing, where the shaft is provided with a handle 38. Thus by turning each shaft 37, the base and post with each prism 11 can be adjusted toward and away from the front of the casing. This adjustment of the prisms 11 aids in getting proper alignment of the two images or pictures.

From the foregoing it will be seen that the light rays passing through each of the lens barrels will strike the front face of the upper prism 10 and be reflected by the mirror backing of said prism to the lower prism 11 and the mirror backing of this prism will reflect the rays through the prism 24 and through the lenses 25 into the camera through the opening 6. The paths followed by the light rays are indicated by the letter A and as will be seen from Figure 1, the prism 24 will cause the light rays to approach each other on the lenses 24 so that duplicate images will be simultaneously formed and merging with each other.

This device can also be used for projecting pictures by passing the light rays through the openings 6 and the various lenses and prisms and through the lenses in the barrels 7 and 8. When this is done, however, the lenses 24 and 25 are interchanged and the barrels 7 and 8 are adjusted to bring the two images in proper alignment on the screen. The various adjustments shown are made for infinitive focus.

It is thought from the following description that the advantages and novel features of the invention will be readily apparent.

It is to be understood that changes may be made in the construction and in the combination and arrangement of the several parts, provided that such changes fall within the scope of the appended claims.

What I claim is:—

1. A photographic apparatus, comprising a casing, a pair of lens barrels at the front of the casing, pairs of opposed prisms within the casing for receiving light rays from each barrel, one prism of each pair reflecting the rays from the barrel to the other prism, a substantially flat prism receiving the light rays from said other prism, lenses rearwardly of the casing in front of an opening therein through which the light rays from the flat prism pass, a base for each pair of prisms and within the casing, an extensible standard supported on each base, means swingingly connecting the prisms of the pairs and standards, means manually operable without the casing to adjust the standards, and mechanism operative on one prism of each pair and said flat prism for simultaneous adjustment thereof with respect to each other.

2. A photographic apparatus, comprising a casing, a pair of lens barrels at the front of the casing, pairs of opposed prisms within the casing for receiving light rays from each barrel, one prism of each pair reflecting the rays from the barrel to the other prism, a substantially flat prism receiving the light rays from said other prism, lenses rearwardly of the casing in front of an opening therein through which the light rays from the flat prism pass, a base for each pair of prisms and within the casing, an extensible standard supported on each base, means swingingly connecting the prisms of the pairs and standards, means manually operable without the casing to adjust the standards, mechanism operative on one prism of each pair and said flat prism for simultaneous adjustment thereof with respect to each other, and means for independent adjustment of the lenses at the rear of the casing.

In testimony whereof I affix my signature.

LAWRENCE HOLDER.